Aug. 26, 1958 C. H. SAUER 2,849,224
VEHICLE STABILIZING SYSTEM AND METHOD
Filed Jan. 23, 1951

INVENTOR.
CHRISTIAN H. SAUER
BY
Boyken, Mohler & Beckley.
ATTORNEYS

United States Patent Office 2,849,224
Patented Aug. 26, 1958

2,849,224
VEHICLE STABILIZING SYSTEM AND METHOD
Christian H. Sauer, Chico, Calif.
Application January 23, 1951, Serial No. 207,298
3 Claims. (Cl. 267—8)

This invention relates to vehicle suspensions and particularly to a stabilizer means for improving the riding qualities of a vehicle body sprung on ground wheels. Although the present invention may herein be referred to as a "stabilizer" or "stabilizer means," it should be understood that the invention is not restricted to integrating and controlling the movements of the individual wheels, but also contemplates improving the riding qualities of any vehicle sprung on ground wheels. Thus, as will be seen, the present invention not only obviates the use of conventional stabilizer bars employed in so-called "knee action" suspensions having soft springs, but also contributes to smoothing out the effect of rough roads insofar as the comfort and safety of the passengers in the body is concerned.

Conventional automobiles are being provided with softer and longer springs as time goes on, and as the quality of the highways improves. Such a construction, though desirable if use of the vehicle is restricted to smooth highways, effects practically no improvement over vehicles of old design when used on rough roads. Furthermore, the softer springs of conventional automobiles permit shifting of the body with respect to the running gear creating a dangerous condition often resulting in the automobile overturning on extremely rough roads. The fact that at this time provision has been made commercially in at least one instance to supply interchangeable valves in the vehicles' shock absorbers for use with various types of roads is a significant indication that the improved ride control of modern automobiles is manifest only when such vehicles are used on good roads.

With the present-day soft suspension, it is not unusual for the automobile body to jump 13 or 14 inches away from its normal position with respect to the running gear or wheels when rough roads are encountered at high speeds. Such a result not only reduces the comfort of the passengers but creates an extremely dangerous condition especially if a turn is being made at the time. In the case of a turn, the body rolls or swings over toward the outside of the turn, not infrequently resulting in the automobile overturning.

The valve of the shock absorbers presently employed in connection with the above described condition is not satisfactory. However, it should be noted that present shock absorbers are designed to yieldably permit relative movement of body and running gear at all times, and not to positively prevent such movement except at certain particular positions of the body with respect to the running gear. Furthermore such shock absorbers may and do undergo mechanical failures and become virtually useless for their desired purpose after relatively long periods of non-use and after considerable use. Thus, when an automobile undergoes a relatively sharp turn and such a turn is maintained, the cumulative upward movements of the side of the body nearer the center of turn becomes even more appreciable so that the center of gravity shifts so as to aggravate the unstable condition. Similarly when shock absorbers cease to function for some reason the instability of the vehicle becomes more pronounced on rough roads, even during direct forward travel of the vehicle.

It is therefore the main object of the invention to overcome the disadvantages inherent in prior art vehicle suspensions and to provide a better ride control of vehicles having bodies sprung on ground wheels.

Another object of the invention is the provision of an improved shock absorbing apparatus for vehicles for effecting a smoother ride control on rough roads.

Still another object is the provision of a stabilizer means for preventing dangerous shifting of the center of gravity of a vehicle while such vehicle is in a turn.

Another object is a ride control apparatus including an improved shock absorber means for improving the riding quality of a vehicle and which apparatus will function to maintain the desired stability of the vehicle regardless of failure of such shock absorber means.

An additional object of the invention is a method of stabilizing a vehicle having a body sprung on running gear during the running and turning of said vehicle.

The present invention contemplates the provision of a stabilizer means for preventing objectionable vibration from occurring in a vehicle body driven on a rough road. The present invention therefore differs from conventional devices having a similar object in that the latter purport to dampen out vibration after it has started.

With a view to preventing undue relative movement of the vehicle body with respect to the running gear, the present invention provides means for positively preventing such movement under certain conditions. However, yieldable means is also provided between body and running gear to effect a smoother ride.

The particular embodiment, herein described in detail and illustrated in the drawings, is to be taken as the preferred form only of the invention as it will be apparent that the broad concept involved may be carried out by different means without departing from the invention herein described and claimed.

Front wheel coil spring suspension

Figure 1:
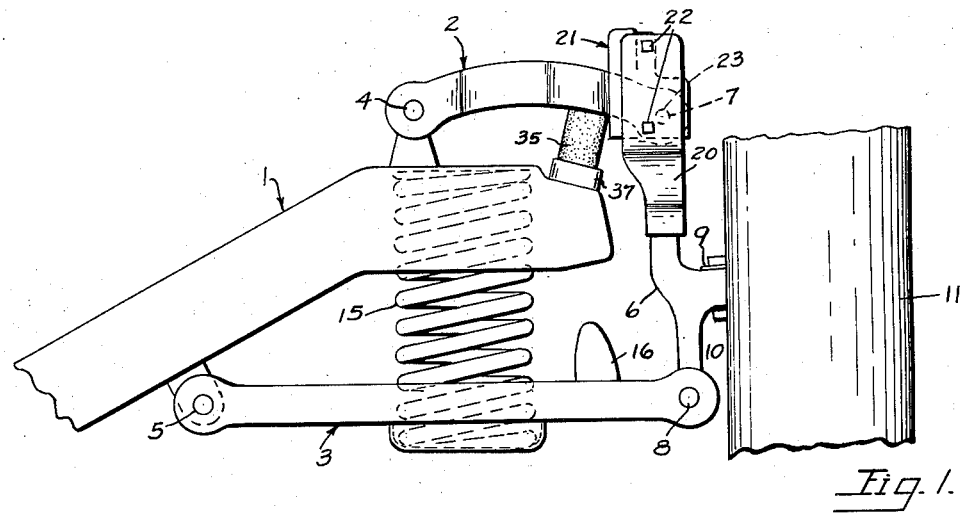
Fig. 1 is a front elevational view of the portion of an automobile suspension adjacent one of the forward wheels. Only one wheel is illustrated, it being understood that both front wheels carry identical apparatus except that they are constructed to opposite hands.
Figure 2:
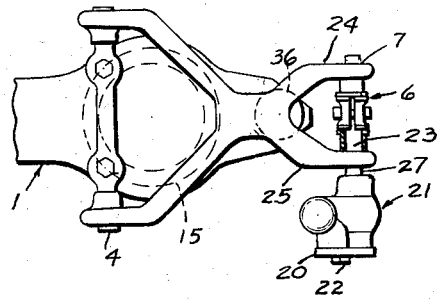
Fig. 2 is a plan view of the upper portion only of the structure of Fig. 1.
Figures 3, 4:
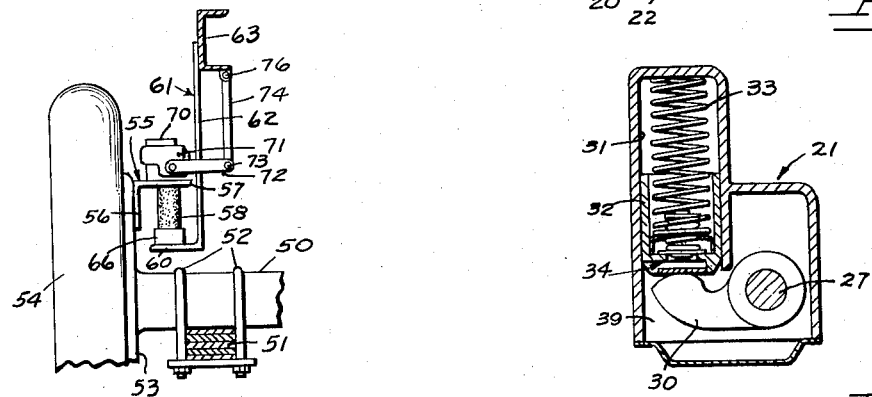
Fig. 3 is a vertical cross-sectional view of the hydraulic unit of the invention.
Fig. 4 is a rear elevational view of one of the rear wheels of an automobile showing the apparatus of the invention as employed in connection therewith. Only one side of the vehicle is shown, the other being identical but to the opposite hand.

In the drawings an embodiment of the invention is shown as applied to a front wheel suspension of an automobile having so-called "knee action" (Figs. 1, 2). The invention, as shown in Fig. 4 is applied to the rear end of a car having leaf springs. It will be understood that the invention is applicable to vehicles having front and rear leaf springs or those having front and rear coil springs as well as to the most popular type of suspension shown in the drawings.

In detail, the invention may be applied to the running gear of an automobile having a transverse frame member 1 to which is pivotally secured upper and lower control arms 2, 3 respectively. The arms 2, 3 are secured at their inner ends to the frame member 1 by pivots 4, 5 respectively. The outer ends of these arms 2, 3 are secured to the upper and lower ends of a knuckle support 6 by pivots 7, 8 respectively. The knuckle support 6 carries a king pin bushing 9 intermediate its ends for supporting the knuckle assembly 10 and front wheel 11.

Extending between the frame member 1 and the lower control arm 3 is a relatively large coil spring 15 which is compressed when the wheel moves upwardly relative to the frame member 1 or the body of the vehicle. To prevent forceable striking of the lower control arm 3 against the end of the frame member 1 an upwardly extending rubber bumper 16 is usually provided on the upper side of the lower control arm 3 for engaging said frame member upon excessive movement of said wheel 11 toward the body of the car or downward movement of the body relative to the wheels.

The above described structure is conventional and the invention will be illustrated with respect to this structure. However, it is pertinent to note that the hydraulic shock absorber which usually extends lengthwise through the spring 15 is not required for purposes of the present invention.

Rigidly secured as by welding to the knuckle support 6 is a bracket 20 which extends upwardly and forwardly of the vehicle and to which is secured the housing of a hydraulic cylinder 21, which is in all respects similar to conventional single-acting shock absorber cylinders, except for its mounting means. The hydraulic cylinder 21 is provided with a pair of tapped holes so that the cylinder may be secured to bracket 20 by bolts 22.

As best seen in Fig. 2, a shaft 23 extends between the spaced outer legs 24, 25 of the upper control arm 2, and the knuckle support 6 is pivotally secured at its upper end to said shaft 23 at a point between said legs.

By the present invention, the shaft 23 is fixedly secured to the legs 24, 25 so that upon relative vertical movement of the running gear and frame 1, the shaft 23 will oscillate in the upper end of knuckle support 6. An extension 27 of the shaft 23 is rotatably mounted in the sidewalls of cylinder 21 and is fixedly secured to a cam arm 30 positioned within said housing.

Integrally formed in the housing 21 is a cylinder 31 in which a piston 32 is reciprocable (Fig. 3). The free end of the cam arm 30 is adapted to engage the outer end of the piston 32 at all times, the latter being held against the cam arm 30 by a strong compression spring 33 in the cylinder 31. Clockwise swinging of the cam arm 30 (Fig. 3) will cause the piston 32 to be moved upwardly against the resistance of the spring 33 and the oil which is within the cylinder 31. By the conventional valve arrangement generally designated 34 pressure of the oil in cylinder 31 is relieved when it reaches a predetermined point and is discharged into the oil reservoir space 39.

The shock absorber means 21 is conventional except for the external linkage normally employed to rotate the cam arm 30. However, it should be noted that this shock absorber is single acting and resists only the movement of the wheel downwardly with respect to the body of the vehicle and upward movement of the body relative to the wheel. Upon upward movement of the wheel 11 with respect to the body or with respect to frame 1, the cam arm 30 will be swung in a counterclockwise direction (Fig. 3) against no resistance. Furthermore, the spring 33 urges the cam arm 30 in the last mentioned direction at all times although the force of such spring 33 is not appreciable relative to the weights of the body and the wheels.

For the purpose of the present invention, it is preferable that the cam arm 30 have a static position (with the car loaded but stationary) equivalent to about ⅔ of the total travel of the cam arm 30 in a clockwise direction (Fig. 3). By such an arrangement downward movement of the wheel 11, relative to the frame 1, is resisted by the hydraulic means 21, but the latter offers no resistance to upward movement of the wheel 11 relative to frame 1. For the same reason, upward movement of the frame 1 relative to the wheels will be resisted by the hydraulic means 21, but said frame will be free for downward movement insofar as the action of the hydraulic means is concerned.

By the present invention, a bumper 35 is provided for resisting the same movements which are resisted by the hydraulic means 21. This bumper 35 comprises a length of yieldable material such as rubber and is preferably formed to a cylindrical shape and is positioned with one end engaging the outer end of the frame member 1 and with the other end in engagement with the upper central arm 2 at a point 36 intermediate its ends. An upwardly opening retainer 37 is rigidly secured to the outer end of the frame 1 for receiving and securing the lower end of bumper 35.

The bumper 35 is positioned in retainer 37 so as to engage the upper control arm 2 and the frame member 1 when the vehicle is unloaded. In normal running condition, the bumper 35 will therefore be under a relatively small compressive stress.

Referring to Fig. 1, it will be apparent upon movement of the frame member 1 upwardly with respect to the wheel 11 that the bumper 35 will be compressed and the hydraulic shock absorber means 21 will, at the same time resist such movement.

In operation, with reference to the front wheel suspension of Figs. 1, 2: upon the wheel 11 striking a bump or projection on the road causing upward movement of said wheel, neither the bumper 35 nor the hydraulic shock absorber 21 will offer resistance and only the spring 15 will operate to absorb the impact. Assuming that the vehicle then rebounds so that the frame 1 may be imagined as moving upwardly with respect to the wheel 11, the shock absorber 21 having been set as above described so that the piston 32 will move against the resistance of the oil in the cylinder 31, will yieldably resist said upward (rebound) movement of the frame 1 with respect to the wheel 11. It should be noted that such resistance by the shock absorber 21 will immediately take effect upon initiation of the above-mentioned rebound movement inasmuch as the piston 32 is at all times in engagement with the cam arm 30 by virtue of the force of spring 33 (Fig. 3).

It will be apparent that the yieldable resistance of the hydraulic shock absorber 21 and bumper 35 will combine during upward movement of the frame 1 with respect to the wheel 11 until the bumper 35 is compressed to such an extent that it takes substantially all the load. During the initial stage of such compression of the bumper 35, it will be understood that the deflection or strain of the bumper will be roughly proportional to the compressive stress impressed on the bumper. However, in the later stages of compression, the strain will increase at a relatively slow rate as compared with the impressed stress so that the bumper will positively and unyieldingly prevent upward movement of the frame relative to the wheel beyond a predetermined point.

It is desirable to stress at this point that a spring or other yieldable means may be substituted for the rubber bumper above described with satisfactory results under some conditions. However, it is preferable that the deformation of the bumper is not directly proportional to the impressed stress within the elastic limit of the material employed. Rubber has the characteristic of undergoing slight deformations that are proportional to the impressed stress; but as the stress is increased, the amount of deformation becomes proportionately less so that as a practical matter the rubber becomes a stop, positively preventing further deformation. It will be understood, of course, as in the case of any engineering materials, that the elastic limit of the material should not be exceeded under working conditions. However this is a matter of design only.

From the above explanation, it will be apparent that the wheel 11 will not be completely free to move downwardly when going over a depression without similar movement of the vehicle body and the frame 1. In conventional vehicles of this nature shock absorbing means is generally employed to yieldably resist relative movement of the frame towards and away from the wheel by use of double acting shock absorbers. When single-acting shock absorbers are employed they have the effect of yieldably resisting movement of the frame away from the wheel only as in the present invention but heretofore there has been no positive stopping means employed for positively preventing excessive movement. Furthermore in prior art suspensions employing single-acting shock absorbers of the type herein employed the casings of such shock absorbers are usually secured to the frame of the vehicle and not to the running gear. By the present invention the shock absorbers are secured to the wheels from which impact forces originate so that shocks received by the wheel will not be transmitted to the frame and body. Thus the springs, the rubber bumpers and the shock absorbers of the present invention work together to achieve smooth riding qualities and at the same time the vehicle is made to hug the road making the vehicle feel heavier to the driver and passengers.

By the present invention, it will be apparent that both the bumper 35 and the hydraulic means 21 resist downward movement of the wheel 11 away from the frame 1. Either of two results may follow from this last mentioned structure. If the depression is relatively short in extent in the direction of travel, the wheel will be yieldably held in its normal position tending to cause the wheel to pass over or skip the depression without creating any shock. If the depression is relatively long in the direction of travel, the wheel will drop downwardly and at the same time, the body will move downwardly in like manner inasmuch as its supporting means is removed. The natural result which follows is that the compression spring 15 absorbs the impact created when the downward movement of the body is arrested. However, upon rebound of the body, or in other words, upon movement of the body upwardly away from the wheel 11, hydraulic means 21 will yieldably resist such movement. Furthermore, as hereinbefore described, the bumper 35 will at first also operate to yieldably resist such movement and then quickly stop it.

In the above explanation, the rebound effect of the air inflated tires was disregarded inasmuch as such rebounding, if present, is rapidly dampened out because the spring 15 is much "softer" than the air inflated tires. However, with the present invention, the vehicle will in fact ride smoothly with the tires inflated to relatively high pressures. Inasmuch as the elimination of excessive relative movement of frame and running gear is one of the main objectives of the invention, overinflation of the tires is preferred to underinflation because in the latter case the action remains in the tire.

*Rear wheel leaf spring chassis suspension*

Figs. 4, 5 illustrate the present invention as applied to the rear wheels of an automobile having a leaf spring suspension, but it will be understood that similar structure would be employed if the rear end of the body has a coil spring chassis suspension as is the case with some automobiles.

In Fig. 4, the rear axle housing is designated 50, and leaf spring 51 are secured to said housing by means of shackles 52. The stationary backing plate 53 of the rear wheel 54 is made rigid with the rear axle housing in the usual manner.

Rigidly secured to the backing plate 53 is one leg 56 of an angle support 55 having another leg 57 projecting horizontally inwardly toward the center of the vehicle. This horizontal leg 57 provides an upper support for one end of a bumper 58 which is in all respects similar to bumper 35 of Figs. 1, 2. The opposite end of the bumper 58 is supported on the horizontal leg 60 of an angle support 61 having a vertical leg 62 which may be rigidly secured at its upper end as by welding to the longitudinal frame member 63.

The bumper 58 may be installed in a retainer 66 in like manner as the bumper 35 is installed in the embodiment of Figs. 1, 2. Under normal loading conditions the bumper 58 is under a slight compression which has the effect of tending to urge the frame 63 downwardly.

An upwardly extending bracket 70 is rigidly secured to the upper leg 57 of angle support 55. Mounted on bracket 70 is a single-acting shock-absorber 71 of the conventional type such as is indicated in Fig. 3. However, in the case of the rear end suspension the shock absorber 71 is provided with a generally horizontally extending arm 72 which is rigidly secured at its inner end to the cam arm shaft 27 (Fig. 3). The outer end of the arm 72 is pivotally secured, as at 73, to the lower end of a generally vertically extending link 74 which in turn is pivotally secured at its upper end to the frame 63 as at 76. A cable may be substituted for link 74 if desired to prevent any resistance by the shock absorber 71 to downward movement of the frame.

As in the case of the front end hydraulic means the shock absorber 71 is preferably positioned in a normal loaded condition with the arm 72 horizontal when the cam arm 30 has been rotated ⅔ of its total oscillation in a clockwise direction (Fig. 3). Thus, upon downward movement of the frame 63 relative to the wheel 53, the piston 32 will be in engagement with the cam arm 30 at all times under the urging of spring 33, but upon upward movement of frame 63 relative to wheel 54, the shock absorber 21 will immediately offer yieldable resistance to such movement.

The action of the bumper 58 in such a case is the same as that hereinbefore described in connection with the forward bumper 35.

*Results from operation*

The improved performance achieved by use of the invention insofar as ride control is concerned is partly attributable to the action of the particular shock absorber arrangement whereby rebound movement only is resisted. In use, such an arrangement has been found to prevent undue separation of body and wheels on rough roads, thus improving the comfort of passengers and driver.

The combination of bumper and shock absorber further limits the separation of body and wheels, thereby improving the riding qualities. Probably the most important feature resulting from the use of the bumper hereinbefore described is the improved stability and safety of the vehicle. This feature is particularly noticeable on rough roads during a sharp turn. In conventional suspensions wherein upward movement of the body with respect to the wheels is unresisted (except when double-acting shock absorbers are employed) the side of the car adjacent the center of turn tends to rise away from the adjacent wheels. This lifting action of the inner side of the car will take place even when double acting shock absorbers are employed especially if the turn is prolonged.

The result of such a sharp turn is to oscillate the vehicle around its longitudinal axis to a position with the side outwardly of the center of turn down and the opposite side up. This results in a shift of the center of gravity which, when combined with undue separation of the body and wheels caused by the soft springs when a bump is struck, will, in many instances result in overturning the vehicle.

By virtue of the bumper and shock absorber arrangement, as above described, the weight of the running gear prevents lifting of the inner side of the body during a turn in the objectionable manner above described. Furthermore, the fact that upward movement of the body away from the wheels is positively prevented by the bumpers has the effect of preventing any increase of instability which would otherwise come about due to a shift in the center of gravity of the body. During such a turn the bumpers will remain in yieldable engagement with the frame as the vehicle passes over irregularities in the road, thus achieving a smooth ride.

In connection with this last mentioned feature, it should be noted that the wind effect on a vehicle is different when the body is raised and oscillated than when the body is low and horizontal. For this reason, it is extremely desirable to maintain the vehicle in as low a position as possible and at the same time, prevent tilting of the vehicle from a horizontal plane. This is accomplished by the present invention.

In addition, when starting a vehicle provided with the present invention the front end of the vehicle will not tend to swing upwardly and in stopping the rear end will not tend to swing upwardly. Both shocks and bumpers contribute to this result.

It has been found that the effect of worn-out shock absorbers noticeably increases the instability of a conventional vehicle with a corresponding decrease in ride control and comfort of occupants. By the present invention the bumper provides positive means for preventing such instability even were the shock absorber not to function. The effectiveness of the conventional coil springs or leaf springs is not impaired in any way by the present invention. The "softness" desired in present-day cars is maintained with the added advantage of additional safety and comfort.

As has already been pointed out, by the present invention, the conventional coil or leaf springs that support the body on the wheels may be partially "loaded" or tensioned under compression by the presence of bumpers 35, 58 when the vehicle is lightly, or even moderately loaded. The desirable results of the present invention are largely dependent upon the rapidity with which the body and wheels are resiliently prevented from relative movement away from each other. If the bumper is substantially under compression when the body and wheels tend to move apart relative to each other, there is no likelihood of a shock being felt, but if the load in the vehicle is such that the bumper is actually spaced from one or the other of its end supports when the rebound occurs, then the shock absorber will check the movement of the body and wheels away from each other until the bumper positively prevents further movement should the force be such that the shock absorber would not take it all.

In going around a turn, it will be seen that the present rolling of the body outwardly relative to the center of the turn (resulting in the relative movement of the body and wheels on the inside of the turn moving apart) is yieldably resisted. Hence, instead of the car overturning because of the heretofore permitted outward rolling of the body relative to the wheels, the wheels and body are virtually locked together as a unit and it will almost be impossible for the vehicle to overturn on a turn if the driver is not purposely attempting that result by wholehearted disregard of natural laws. The present low center of gravity of modern automobiles and other vehicles would be adequate to prevent most accidents due to overturning of the vehicle attempting to make turns at high speed were it not for the fact that the bodies of the modern automobiles are so freely sprung on their wheels that they are, figuratively, almost permitted to fly off the wheels.

In line with the above, it is again emphasized that in the present system, the shock absorbers, or whatever the combined bumper and shock absorber structure adjacent the wheels may be called, are resistable to relative movement of the running gear and wheels away from each other with substantially greater force than the resistance to movement of the running gear and wheels toward each other, and preferably this resistance is such as to result in a positive stop at a point that is relatively close to the normal static position of the running gear relative to the body, and may even be effective in such static position when the vehicle is empty or relatively lightly loaded.

From the foregoing, it is seen that this invention also contemplates a method of stabilizing the body of a vehicle that is sprung on running gear in which the relative movement of the body and running gear away from each other relative to their positions when the vehicle is static, level and without passengers or a pay load, is substantially less than the movement of said body toward said running gear when said vehicle is running on a road of any degree of roughness, or turning at any rate of speed whether virtually empty or normally loaded. The steps of the method are obviously conceivable independently of any particular means for carrying them out, and said steps may be defined in other ways as clear from the description. It should be emphasized that the bumpers 35, 58 and the shock absorbers 21, 70 act together to yieldably urge the body and the running gear together. The separate use of either the bumpers or the shock absorbers shown will improve the riding qualities of any vehicle but to obtain the greatest benefit both should be employed together in the manner hereinbefore described.

I claim:

1. In a vehicle having a pair of front wheels respectively mounted on steering knuckle supports, with each of said supports swingably connected to the vehicle body by a pair of vertically spaced arms with a body spring extending between said body and the lower arm of said pair, a compression bumper extending between said body and the upper arm of said pair with its opposite ends in engagement with said body and said upper arm when said body is in a normally loaded condition for resisting movement of said body in a direction away from said wheels, hydraulic means mounted on each of said supports and operatively connected with said upper arm for yieldably resisting movement in said direction only.

2. In a vehicle having a pair of front wheels respectively mounted on steering knuckle supports, with each of said supports swingably connected to the vehicle body by a pair of vertically spaced arms with a body spring extending between said body and the lower arm of said pair, a compression bumper extending between said body and the upper arm of said pair with its opposite ends in engagement with said body and said upper arm when said body is in a normally loaded condition for resisting movement of said body in a direction away from said wheels, hydraulic means mounted on each of said supports and operatively connected with said upper arm for yieldably resisting movement in said direction only, said hydraulic means being positioned to resist movement in said direction simultaneously with the compression of said bumper.

3. In a vehicle having a pair of front wheels respectively mounted on steering knuckle supports, with each of said supports swingably connected to the vehicle body by a pair of vertically spaced arms with a body spring extending between said body and the lower arm of said pair, a bumper extending between said body and the upper arm of said pair with its opposite ends in engagement with said body and said upper arm when said body is in a normally loaded condition for resisting movement of said body in a direction away from said wheels, hydraulic means mounted on each of said supports and operatively connected with said upper arm for yieldably resisting movement in said direction only, said hydraulic means including a spring urged piston yieldably urging said body in a direction toward said wheels at all times.

References Cited in the file of this patent

UNITED STATES PATENTS

| | | |
|---|---|---|
| 924,913 | Mellen et al. | June 15, 1909 |
| 1,319,937 | Wiberg | Oct. 28, 1919 |
| 1,543,581 | Lewis | June 23, 1925 |
| 1,614,392 | Rippy | Jan. 11, 1927 |
| 1,614,721 | Erne | Jan. 18, 1927 |
| 1,679,414 | Elsey | Aug. 7, 1928 |
| 1,817,771 | Sipe | Aug. 4, 1931 |
| 1,931,735 | Lottritz | Oct. 24, 1933 |
| 2,108,881 | Casper | Feb. 22, 1938 |
| 2,201,030 | Deutsch | May 14, 1940 |
| 2,201,250 | Utz | May 21, 1940 |
| 2,253,645 | Paton | Aug. 26, 1941 |